No. 720,987. PATENTED FEB. 17, 1903.
F. L. O. WADSWORTH.
ILLUMINATING GLASS STRUCTURE.
APPLICATION FILED JULY 28, 1898.

NO MODEL.

WITNESSES:

INVENTOR,
Frank L. O. Wadsworth
BY
ATTORNEYS.

UNITED STATES PATENT OFFICE.

FRANK L. O. WADSWORTH, OF WILLIAMS BAY, WISCONSIN, ASSIGNOR, BY MESNE ASSIGNMENTS, TO PRESSED PRISM PLATE GLASS COMPANY, A CORPORATION OF WEST VIRGINIA.

ILLUMINATING GLASS STRUCTURE.

SPECIFICATION forming part of Letters Patent No. 720,987, dated February 17, 1903.

Application filed July 28, 1898. Serial No. 687,134. (No model.)

*To all whom it may concern:*

Be it known that I, FRANK L. O. WADSWORTH, of Williams Bay, in the county of Walworth and State of Wisconsin, have invented a new and useful Improvement in Illuminating Glass Structures, of which the following is a full, clear, and exact description, reference being had to the accompanying drawings, forming part of this specification, in which—

Figure 1:
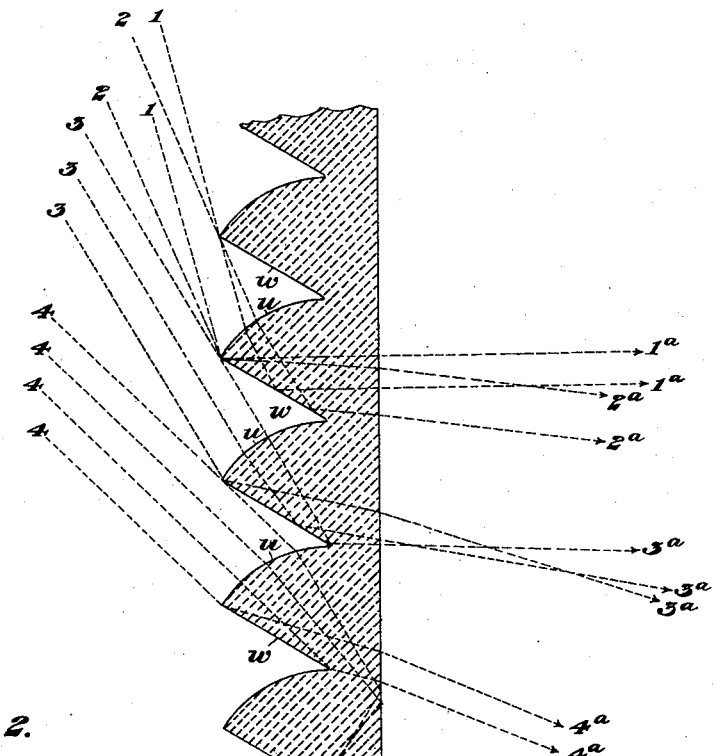
Figure 2:
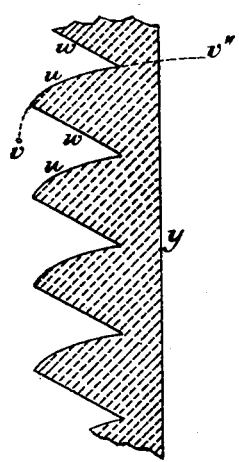
Figure 3:
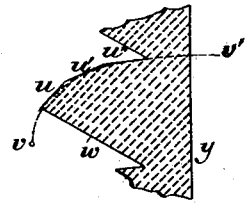
Figure 4:
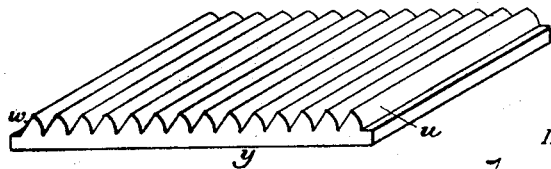

Figure 1 represents in cross-section a portion of the improved structure. Figs. 2 and 3 are illustrated modifications, and Fig. 4 is a view showing an illuminating-plate of improved construction.

The present application refers to that form of illuminating structure in which the prismatic elements are on the front or receiving side of the structure and in which the light is deflected into the space to be illuminated by reflection from the lower faces $w$ $w$ of the successive prism elements after first being refracted at the series of receiving-faces $u$ $u$ of the elements.

In the previous application Serial No. 687,133 I have shown the advantage of forming the refracting-faces $u$ of prisms in such a way that the inner part of the face is more nearly perpendicular to the plane of the structure than the outer part, and in another application, Serial No. 687,132, I have shown how by suitably curving faces corresponding to there flecting-faces $w$ a larger proportion of the light coming from different directions outside may be directed into the room in the required direction than is possible when the faces of the prism elements are plane. In the present application I secure this same result by curving the refracting-faces $u$ $u$, leaving the deflecting-faces $w$ $w$ flat. I have found that the form of curved faces which is most efficient in securing this desired result is one which corresponds in cross-section with a curve $v$ $v''$, Fig. 2, of which the vertex $v$ is at a point in front of the illuminating structure and of which the curvature continually increases from the vertex $v$ toward the back of the structure. This curve is one of the conic sections—that is, either an elipse, a hyperbola, or parabola—and as the prismatic elements generally extend transversely across the whole structure the curved surface as a whole is a portion of the corresponding conic cylinder. The curvature is preferably, however, hyperbolic. It is not necessary that the surface should be a continuously-curved one, for the desired result may be accomplished by making the surface a series of flat steps $u$ $u'$ $u''$, Fig. 3, these successive flat faces forming tangent planes to the conic cylinder.

The action of such an improved structure upon rays of light falling upon it from different directions from outside is illustrated in Fig. 1. It will be seen that the rays 1 1, 2 2, 3 3 3 are acted upon by the surfaces $u$ and $w$ in succession in such a way as to emerge from the inner side of the structure in the directions $1^a$ $2^a$ $3^a$ nearly parallel to each other. Rays, such as 4 4, coming from more nearly horizontal directions are refracted at the faces $u$ in such a way as in part to fall on the faces $w$ and from thence be reflected into the room in the direction $4^a$ $4^a$ and in part to fall upon the inner plane side $y$ of the structure at less than the critical angle. This latter portion of the rays is therefore totally reflected at the surface $y$, passes out toward the front side of the structure in the directions $4^b$ $4^b$, and after a series of successive refractions at the faces $u$ and $w$ finally falls upon a face $w$ at such an angle as to be totally reflected into the room in the direction $4^c$ $4^c$.

By making the refracting-surfaces $u$ of the prism elements curved, as above explained, I am enabled to collect from the outside of the room or building in which the prisms are used rays coming from many different directions and to direct them all into the room in substantially the same main direction, securing thus a much greater illuminating effect at any desired point than is possible with prismatic elements all of whose surfaces are plain.

The face $y$ of the structure need not be plain, as shown in the drawings, but may be ribbed or corrugated. The illuminating structure may be built up of separate prisms suitably cemented or united, or it may be constructed of a single integral piece, as shown in the drawings.

Within the scope of my invention as defined in the claims many modifications may be made by those skilled in the art, since

What I claim is—

1. An illuminating structure having on the receiving side a series of prisms with light receiving and refracting surfaces curved to correspond to portions of conic cylinders; substantially as described.

2. An illuminating prism-plate having on the receiving side a series of prisms whose receiving and refracting faces $u, u$ are curved to correspond in cross-section to a hyperbola whose vertex $v$ lies on the front surface of the prism; substantially as described.

3. An illuminating prism-plate having a plain discharging-face, and on the receiving-face a series of prisms whose receiving and refracting surfaces $u, u$ are curved to correspond to hyperbolic cylinders, and whose reflecting-surfaces $w, w$ are plain and inclined at such an angle that the rays incident thereon are reflected in a direction substantially normal to the discharging-face of the prism-plate; substantially as described.

4. An illuminating-prism having a cylindrical curved refracting-surface on the receiving side and a plain internally-reflecting surface wherefrom the rays are refracted in a direction substantially normal with the emergent face of the prism; substantially as described.

5. An illuminating-prism having on the receiving side surfaces $u, w$, the refracting-surface $u$ being curved to correspond in cross-section with a portion of a conic curve, and the internally-reflecting surface $w$ being plain; substantially as described.

6. An illuminating-prism having upon its receiving side curved refracting-surfaces and plain reflecting-surfaces also on the receiving side and joining the said curved surfaces, the latter curved in cross-section to correspond to a hyperbola whose vertex is at a point in front of the illuminating structure with the curvature continually increasing from the said vertex toward the back of the prism.

In testimony whereof I have hereunto set my hand.

FRANK L. O. WADSWORTH.

Witnesses:
C. BYRNES,
G. I. HOLDSHIP.